Nov. 15, 1955     A. JANOSSY     2,723,454

BUTTER SLICER

Filed Aug. 26, 1952

ALEXANDER JANOSSY.
INVENTOR.

BY Eugene C. Knoblock

ATTORNEY.

United States Patent Office 2,723,454
Patented Nov. 15, 1955

2,723,454
BUTTER SLICER
Alexander Janossy, South Bend, Ind.
Application August 26, 1952, Serial No. 306,392
8 Claims. (Cl. 31—20)

This invention relates to improvements in butter slicers. The device is particularly well suited for use in restaurants, hotels and institutions, to slice butter for service in small measured quantities.

The objects of the invention are to provide a device of this character which is compact, easy to operate, which avoids sticking of butter, which is sanitary and provides an enclosure for the butter when not in use, which can be loaded easily and expeditiously, which can be operated to expose for accurate measurement the amount of butter being sliced, and which can be rapidly dismantled and then reassembled to facilitate cleaning and repair or replacement or parts.

Other objects will be apparent from the following specification.

Figure 1:
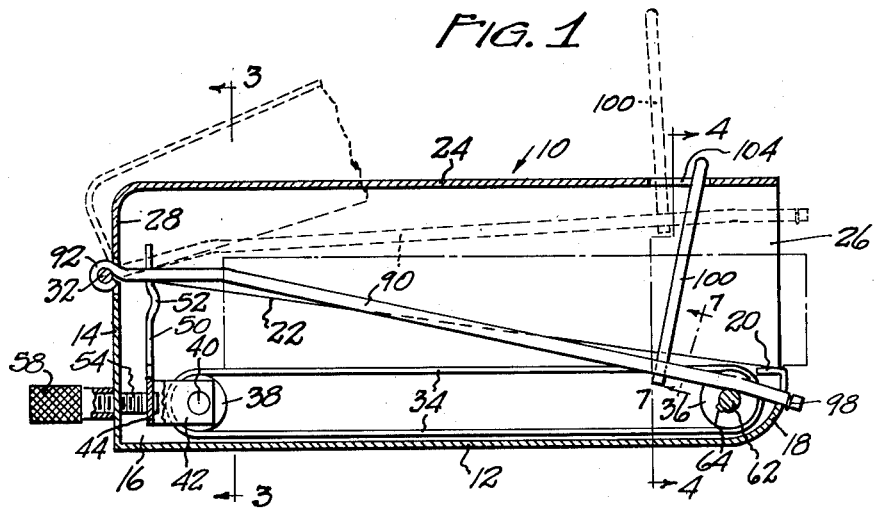
Fig. 1 is a longitudinal vertical sectional view of the device taken on line 1—1 of Fig. 2.
Figure 5:
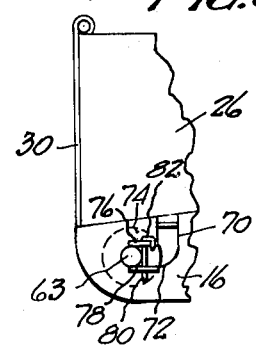
Fig. 5 is a fragmentary side elevational view of the device illustrating a detail of an alternative construction.

Referring to the drawing which illustrates the preferred embodiment of the invention, the numeral 10 designates a two-part housing or container. The container is preferably formed of an upper part and a lower part. The lower part comprises a bottom panel 12, a rear panel 14, side panels 16, and a front wall 18 which preferably curves upwardly as illustrated in Figs. 1 and 5, and which terminates in an inturned flange 20. The top edge 22 of the side walls 16 is preferably inclined as illustrated, with the rear wall 14 being taller than the front wall 18, although this is not essential.

The cover portion of the container preferably includes a top panel 24, side panels 26, and a rear panel 28. The front cover of the container will preferably be open, although a closure panel 30 may be hinged thereto, preferably at its upper end, as illustrated in Fig. 5, if desired. The two parts of the container are pivotally connected by a horizontal pivot pin 32 at the rear end of the device, as illustrated in Fig. 1. The container may be formed of metal, plastic, or any other material found suitable or desirable.

A conveyor or movable support is positioned within the container at the lower part thereof and is wholly mounted and supported by and confined within the lower container portion. The conveyor is preferably in the nature of an endless belt 34 trained around a front roller 36 and a rear roller 38, which rollers may be corrugated or roughened to provide traction with the conveyor web. The conveyor web preferably constitutes an endless belt formed of rubber, synthetic rubber or a synthetic resin, and will preferably be reinforced to limit stretching thereof.

The rear or innermost roller 38 has a shaft portion 40 whose ends project slightly from the ends of the roller and fit in apertures formed in the arms 42 of a substantially U-shaped bracket including an intermediate web portion 44. The bracket will preferably possess a certain amount of resilience, and the arms may be spread laterally to facilitate insertion of the roller therebetween, with the ends of the roller shaft 40 fitting into apertures in the arms. The web portion 44 of the bracket will preferably include an upstanding plate 50 providing a stop and preferably having forwardly offset transverse ribs 52 intermediate its height. The bracket 42, 44 is adjustably positioned by screw-threaded means. As here illustrated, such means include threaded shaft 54 fixed at one end to bracket part 44. Shaft 54 preferably passes through an opening in the rear wall 14 of the container and a knob 58 is threaded on the outer part of shaft 54 with its end bearing against the container end wall 14. It will be apparent that a limited amount of longitudinal adjustment of the bracket 42, 44 will be accommodated by this construction.

Figure 4:
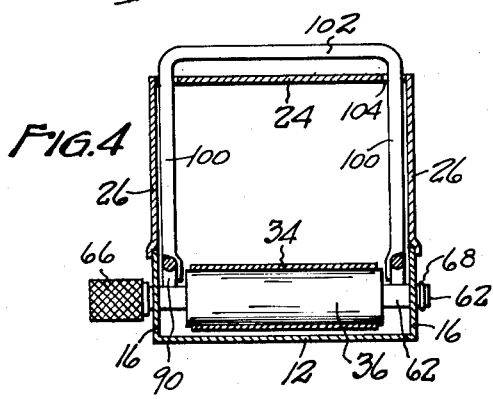
Fig. 4 is a vertical transverse sectional view taken on line 4—4 of Fig. 1.

The front roller 36 around which the belt 34 is trained is mounted on a shaft 62. In the embodiment of the invention illustrated in Figs. 1 and 4, the shaft 62 is formed separately from the roller 36 and has a splined driving connection 64 therewith. The shaft and the roller are slidable relatively longitudinally but are not relatively rotatable. The shaft in this form will extend through apertures in the opposite side walls 16 of the container, and one end of the shaft will mount a knob 66 and the other end of the shaft will mount a retainer 68, such as a split ring positioned exteriorly of the adjacent side wall. The knob and retainer serve to prevent endwise movement of the device, but the split retainer is removable to accommodate ready disassembly of the device by pulling the shaft 62 endwise through the receiving openings therefor.

Figure 6:
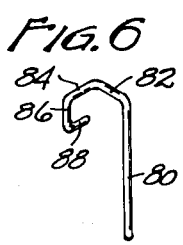
Fig. 6 is an enlarged perspective view of a retainer employed in the device shown in Fig. 5.

An alternative construction is illustrated in Figs. 5 and 6 which eliminates the necessity for relative longitudinal shiftability of the shaft and roller. In this construction, one of the side walls 16 will be apertured to rotatably receive or journal one end of the roller mounting shaft 63 therein. The opposite side wall will preferably be constructed, as illustrated in Fig. 5, by the formation therein of a vertical slot 70 communicating with a horizontal slot 72, which slots 70 and 72 accommodate the movement of one end portion of the shaft 63 therethrough to and from the operative position thereof, as illustrated in Fig. 5.

A tongue or other portion 74 of the side wall overlies the horizontal slot portion 72, and the container, where formed of sheet metal, is preferably flanged at 76. Where the container is molded, a thickened wall portion or rib may be provided in place of the flange 76. A similar flange or thickened wall portion 78 is preferably formed extending along the lower edge of the wall 78. These two flanges or portions 76, 78 have aligned apertures therein to receive a pin 80 which will be so oriented with respect to the inner end wall 72 as to form a retainer confining the shaft portion 63 in the inner end of the container. The pin 80 will preferably be constructed as illustrated in Fig. 6, having a portion 82 bent substantially perpendicularly therefrom at one end and adapted to lie flat upon the upper surface of the flange 76. A portion 84 is bent from the outer end of the portion 82, preferably perpendicular thereto and to the pin 80 to likewise bear against the top face of the flange 76. A part 86 is bent from the part 84 to extend substantially parallel to the pin 80, and a terminal part 88 is bent from the part 86 to extend substantially parallel to the part 84. The parts 84, 86, 88 cooperate to form a hook which extends around the edge of the flange 76 and which is releasable from said flange by rotation of the pin approximately one-quarter turn counterclockwise from the position illustrated in Fig. 6. It will be apparent that this construction permits the insertion of the roller unit in the container by the simple expedient of inserting the free end of the roller through an aperture in one side wall and then lowering the portion of the shaft 63 between the roller 36 and the knob 66 through the slot 70, and thence laterally shifting the same in the horizontal slot 72 to the position illustrated in Fig. 5, whereupon the retainer pin can be inserted to hold the shaft in this position.

Figure 2:
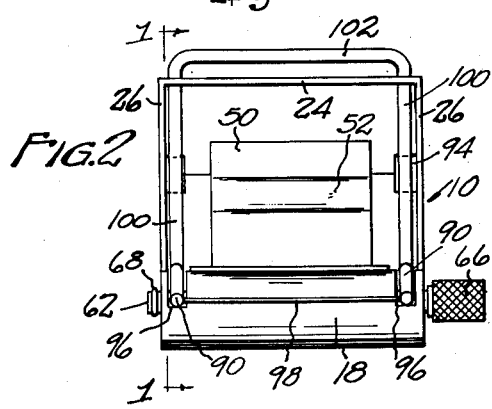
Fig. 2 is a front end view of the device.
Figure 3:
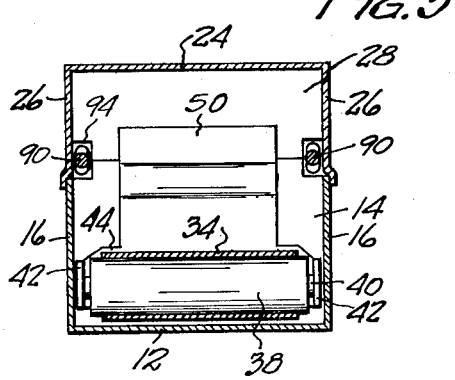
Fig. 3 is a vertical transverse sectional view taken on line 3—3 of Fig. 1.
Figure 7:
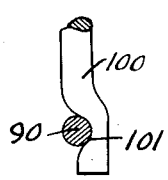
Fig. 7 is an enlarged detail sectional view taken on line 7—7 of Fig. 1.

The construction of the device is one wherein the conveyor 34 and the roller 36 are of such dimension as to provide a clearance or spacing thereof from the opposite side walls of the container. This spacing accommodates a cutter carrier. As here illustrated, the cutter carrier comprises a pair of elongated substantially rigid arms 90 which extend longitudinally of the device and whose end portions 92 are journaled or pivoted upon the pivot pin 32. The rear end walls 14 and 28 are preferably provided with apertures 94 to receive the rod ends 92. The arms or rods 90 extend full length of the device and preferably project from the front thereof through the open front of the cover of the device. Also, as illustrated in Fig. 2, slots 96 are formed in the front wall 18 to a depth greater than the thickness of the rods 90 to receive the rods, in which event the rods pass the opposite ends of the rollers 36 and the opposite sides of the conveyor web 34, as illustrated in Fig. 1. The projecting end portions of the rods or arms 90 are transversely slotted or apertured to receive a cutting wire 98 of thin or fine gauge of cross-sectional dimension, which wire may be anchored to the arms 90 in any suitable manner, as by being bent around said arms or by having headed ends received in countersunk apertures in the arms. The wire 98 is so located that it will just clear the front surface of the upper margin of the front wall 18 when the arms are pivoted. The arms 90 are also interconnected by an inverted U-shaped member having substantially parallel arms 100 interconnected by a transverse hand grip portion 102 which extends exteriorly of the top wall 24 of the device, the arms 100 passing through elongated slots 104 in said top wall 24. The arms 100 preferably have a hooked detachable interlock with arms 90 with outwardly facing notches or bend sockets 101 therein to receive arms 90 as shown in Fig. 7. It will be apparent that, when the hand grip portion 102 is gripped, the arms 90 can be swung between the lower position illustrated in full lines in Fig. 1, and an elevated position illustrated in dotted lines in Fig. 1.

In the use of the device, when it is desired to load the device, the upper part of the container is swung open, as in the dotted line position in Fig. 1, and the piece of butter 104 to be sliced can then be placed upon the container web 34. It will be apparent that the raising of the cover of the device will likewise raise the arms 90 of the cutter unit. When the butter has been mounted upon the conveyor web, the container is closed by lowering its cover portion to operative position. Thereupon, when it is desired to cut a slice of butter from the slab or brick, the cutter unit is raised to the dotted line position shown in Fig. 1 so that the cutting wire 98 will be clear of and above the top edge of the brick. Thereupon the knob 66 is rotated to advance the brick through the open end of the device to the desired extent. Thereupon, the hand grip 102 is grasped and moved downwardly to cause the cutting wire 98 to slice through the butter. The butter at the point being sliced will be supported upon the shelf or flange 20 forwardly of the front end of the conveyor and a clean and effective cutting or slicing action occurs. In this connection, the small clearance between the wire and the front surface of the upper part of the front wall portion 18 also assists in effecting a clean cut. It will also be observed that as the wire is lowered past the level of the flange 20 to the Fig. 1 position at which the arms 90 rest upon the bottom edges of the slots 96, the wire passes clear of or moves away from the front surface of the wall 18 because of the arcuate curvature of that front wall. This is important to insure that adhesion will not occur between the wire and the front wall of the device in the event any butter should stick to the wire incident to the cutting action. Where a series of slices are to be cut, the operation is repeated with successive operations of raising the cutter unit, rotating the knob to advance the butter, and lowering the cutter unit to effect a slicing action.

One of the advantages of the device is the fact that contact between the butter and the container is limited to the conveyor web 34, the flange 20, the wire 98, and the plate 50. The plate 50 serves as a stop, determining the rearmost position in which the brick of butter may be positioned within the container. It will be obvious that this stop is optional and not essential. Contact of the butter with other parts of the device is unnecessary, and, likewise, the operator need not touch the brick of butter while it is being sliced.

The adjustable mounting of the rear conveyor roller 38 is important from the standpoint of tightening the conveyor web and insuring that an adequate tension is exerted to advance the butter when the knob 66 is rotated. Consequently, if the conveyor web becomes loose so that rotation of the knob 66 will not advance it properly, then all that is required is the adjustment of the screw 54 by rotation of knob 58 to shift the roller 38 and increase the spacing between the rollers 36 and 38. The adjusting mechanism similarly is important to compensate for the sizes of different belts where a new conveyor belt is installed in the device.

One of the outstanding advantages of the device is the fact that it can be dismantled rapidly and readily for cleaning, and complete access to all parts of the device can be secured for cleaning. The dismantling operation entails the release of the roller 36 either by removal of the split ring 68 in the embodiment shown in Fig. 4, or by removal of the retainer pin 80 in the embodiment shown in Figs. 5 and 6. This action is then followed by removing the bracket 42, 44 from the container and then spreading the arms 42 of the bracket which mounts the shaft 40 of the roller 38 to release that roller from the bracket. This action completely separates the conveyor from the device, rendering accessible all parts of the container.

The arms 90 and the other parts of the cutter unit all have a substantial amount of free play and relative movement with respect to the container and are of such size and shape that access to all parts thereof and to all parts of the container for cleaning purposes is readily accomplished, and, consequently, removal of the cutter unit is not ordinarily required for cleaning purposes. However, it may be removed by the simple expedient of removing the handle 100, 102 from arms 90 and removing the pivot pin 32 which also accomplishes the function of separating the two container parts from each other. It will be evident from the foregoing explanation that a few simple manipulations facilitate complete disassembly of the device and that reassembly of the parts can likewise be accomplished by reverse manipulations. The arms 90 are preferably normally rigid, but are capable of being bent to provide a fine adjustment of position of the cutting wire relative to container end wall 18, and to provide maximum down travel of the wire relative to the level of the conveyor.

While the preferred embodiment of the invention has been illustrated and described, it will be understood that changes in the construction may be made within the scope of the appended claims without departing from the spirit of the invention.

I claim:

1. A butter slicer comprising a container formed of two pivotally connected parts and having a discharge opening at one end, a conveyor unit including a shiftable member adapted to support and position a brick of butter in said container and to project the same through said opening, and a cutter unit including laterally spaced vertically shiftable arms pivoted to said container at the end opposite said opening and positioned at opposite sides of said butter brick and interconnected by a cutting wire extending transversely of said container and shiftable in a path adjacent to the discharge end of the container, said conveyor including a pair of rollers and an endless web trained around said rollers, a retainer for mounting one roller in said container, and an adjustable carrier releasably mounting the other roller.

2. A butter slicer comprising a container formed of two pivotally connected parts and having a discharge opening at one end, a conveyor unit including a shiftable member adapted to support and position a brick of butter in said container and to project the same through said opening, and a cutter unit including laterally spaced vertically shiftable arms pivoted to said container at the end opposite said discharge opening and positioned at opposite sides of and alongside said butter brick and interconnected by a cutting wire extending transversely of said container and shiftable in a path adjacent to the discharge end of the container, said conveyor including a pair of rollers and an endless web trained around said rollers, one roller having shaft end portions projecting therefrom, said container having an aperture journaling one shaft end portion and a slot removably mounting the other shaft end portion, and a retainer releasably carried by said container for locking said last named portion in said slot.

3. A butter slicer comprising a container formed of two pivotally connected parts and having a discharge opening at one end, a conveyor unit including a shiftable member adapted to support and position a brick of butter in said container and to project the same through said opening, and a cutter unit including laterally spaced vertically shiftable arms pivoted to said container at the end opposite said discharge opening and positioned at opposite sides of and alongside said butter brick and interconnected by a cutting wire extending transversely of said container and shiftable in a path adjacent to the discharge end of the container, said conveyor including a pair of rollers and an endless web trained around said rollers, a carrier shiftable in said container and releasably supporting and journaling one roller, and means for shifting said carrier.

4. A butter slicer comprising a container formed of two pivotally connected parts and having a discharge opening at one end, a conveyor unit including a shiftable member adapted to support and position a brick of butter in said container and to project the same through said opening, and a cutter unit including laterally spaced vertically shiftable arms pivoted to said container at the end opposite said discharge opening and positioned at opposite sides of and alongside said butter brick and interconnected by a cutting wire extending transversely of said container and shiftable in a path adjacent to the discharge end of the container, said conveyor including a pair of rollers and an endless web trained around said rollers, a carrier shiftable in said container and including a pair of resilient apertured arms receiving one roller with a snap fit to journal it, and means for shifting said carrier.

5. A butter slicer comprising a container formed of two pivotally connected parts and having a discharge opening at one end, a conveyor unit mounted in said container and adapted to support and position a brick of butter in said container and to project the same through said opening, and a cutter unit including laterally spaced vertically shiftable arms pivoted to said container and positioned at opposite sides of and alongside said butter brick and interconnected by a cutting wire extending transversely of said container and shiftable in a path adjacent to the discharge end of the container, said container having an end wall portion below said opening which is curved downwardly and rearwardly, said wire having a slight clearance with the upper margin of said end wall portion.

6. A butter slicer comprising a container formed of two pivotally connected parts and having a discharge opening at one end, a conveyor unit mounted in said container and adapted to support and position a brick of butter in said container and to project the same through said opening, and a cutter unit including laterally spaced vertically shiftable arms pivoted to said container and positioned at opposite sides of said butter brick and interconnected by a cutting wire extending transversely of said container and shiftable in a path adjacent to the discharge end of the container, said container having an end wall portion below said opening which is curved downwardly and rearwardly and which has vertical notches to receive said arms.

7. A butter slicer comprising a container formed of two pivotally connected parts and having a discharge opening at one end, a conveyor unit mounted in said container and adapted to support and position a brick of butter in said container and to project the same through said opening, and a cutter unit including laterally spaced vertically shiftable arms pivoted to said container and positioned at opposite sides of said butter brick and interconnected by a cutting wire extending transversely of said container and shiftable in a path adjacent to the discharge end of the container, said container having an end wall portion below said opening which is curved downwardly and rearwardly and a flange projecting inwardly from said end wall portion to support the portion of a butter brick projecting from said conveyor.

8. A butter slicer comprising a container having a discharge opening, a shiftable butter support mounted in said container, means for shifting said support to propel a brick of butter through said opening, and a slicing unit shiftably mounted in said container and including a transverse wire shiftable in a path adjacent said opening to sever from said brick the portion projecting through said opening, said slicing unit being pivoted to said container and extending through said opening, and the wall of said container below said opening extending downwardly and rearwardly to progressively increase clearance between said wire and wall at the lower end of the path of said wire.

References Cited in the file of this patent

UNITED STATES PATENTS

| 1,188,997 | Roberts | June 27, 1916 |
| 1,207,942 | Lehmann | Dec. 12, 1916 |
| 1,499,235 | Livingston | June 24, 1924 |
| 1,848,186 | McDonald | Mar. 8, 1932 |
| 2,232,420 | Witt et al. | Feb. 18, 1941 |
| 2,356,179 | Proudman et al. | Aug. 22, 1944 |
| 2,580,864 | Upright | Jan. 1, 1952 |

FOREIGN PATENTS

| 3,736 | Sweden | Aug. 24, 1892 |
| 119,739 | Austria | Nov. 10, 1930 |
| 134,965 | Austria | Oct. 25, 1933 |